Patented Mar. 17, 1936

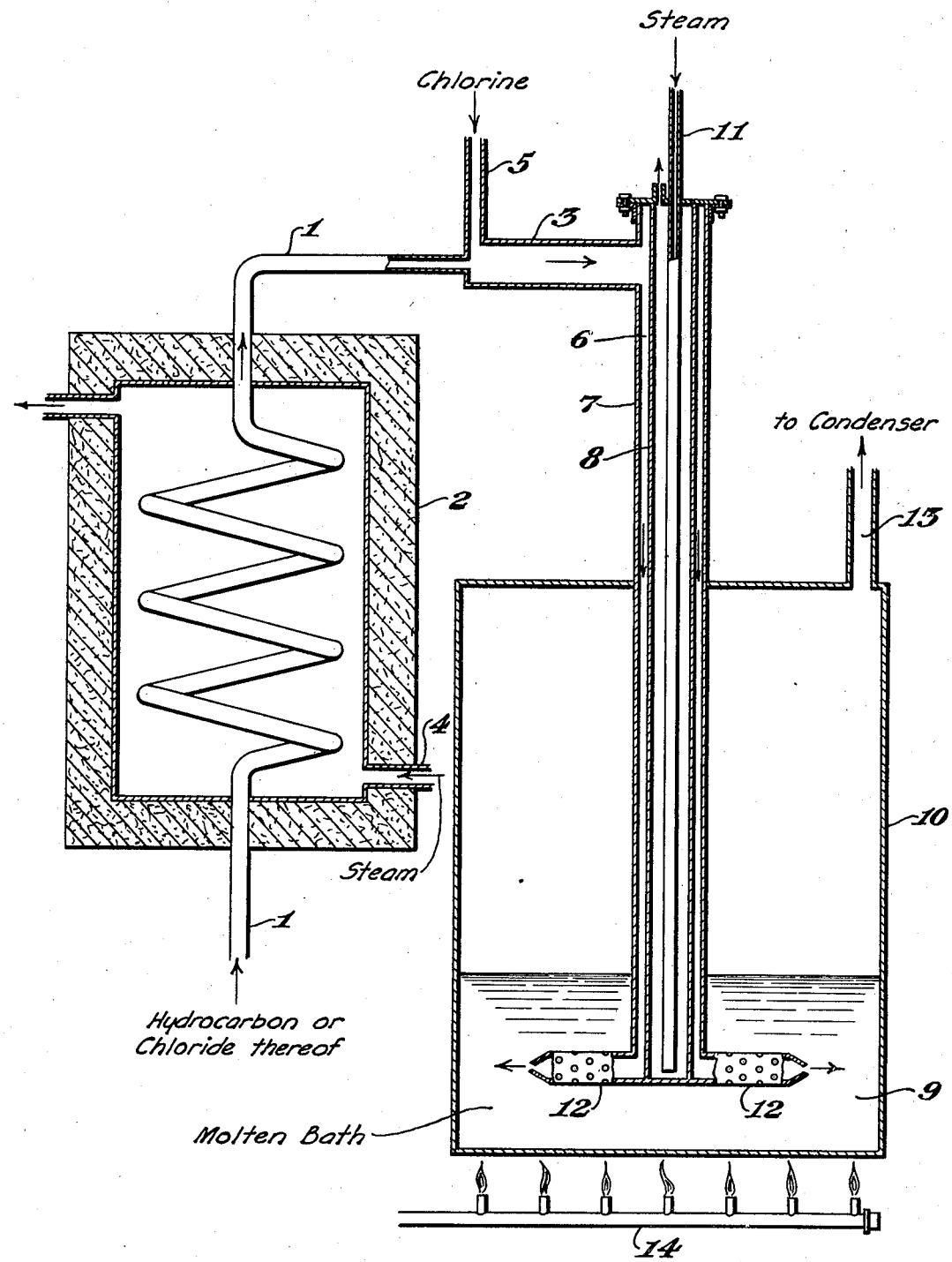

2,034,292

UNITED STATES PATENT OFFICE 2,034,292

PRODUCTION OF CARBON CHLORIDES

John J. Grebe, John H. Reilly, and Ralph M. Wiley, Midland, Mich., assignors to The Dow Chemical Company, Midland, Mich., a corporation of Michigan Application December 15, 1933, Serial No. 702,592

10 Claims. (Cl. 260—166)

The invention relates to processes for the preparation of carbon chlorides, i. e. compounds composed of only carbon and chlorine, particularly tetrachloroethylene.

The preparation of tetrachloroethylene is ordinarily accomplished by chlorinating ethylene to pentachloroethane and reducing the pentachloro-compound with an alkali metal or alkaline earth metal hydroxide. In a copending application of John H. Reilly, Serial No. 654,602 there is set forth a process for the preparation of tetrachloroethylene by the treatment of an olefine chloride with chlorine at temperatures between about 300° and about 500° C. in the presence of a porous surface catalyst, e. g. coke, charcoal, pumice, etc. However, in carrying out this process chlorinated aliphatic hydrocarbons are obtained, as well as carbon chlorides. We have now found that carbon chlorides, and particularly tetrachloroethylene, can be prepared directly in good yields by the treatment of an aliphatic hydrocarbon containing two or more carbon atoms in the molecule, or chlorinated derivatives thereof, without the concurrent production of chlorinated aliphatic hydrocarbons.

To the accomplishment of the foregoing and related ends, the invention, then, consists of the process hereinafter fully described and particularly pointed out in the claims, the annexed drawing and the following description setting forth in detail several modes of carrying out the invention, such disclosed modes illustrating, however, but several of various ways in which the principle of the invention may be used.

In said annexed drawing:—

The single figure is a side sectional elevation of a reactor suitable for use in carrying out our invention.

Our improved process for the preparation of carbon chlorides comprises passing a mixture of an aliphatic hydrocarbon containing two or more carbon atoms in the molecule, or chlorinated derivatives thereof, and chlorine, in the vapor phase, into contact with molten metallic chlorides, maintained at a temperature above about 250° C. but below the temperature at which the carbon chlorides produced are decomposed, preferably between about 250° and 500° C., and condensing the carbon chlorides from the reaction product. The use of ethane or chloro-derivatives thereof produces principally tetrachloroethylene. When aliphatic hydrocarbons containing three or more carbon atoms in the molecule, or their chlorinated derivatives, are treated in the foregoing manner, carbon tetrachloride is produced concurrently with the tetrachloroethylene.

The following Equations (1), (2), and (3) illustrate the reactions by which tetrachloroethylene is obtained from the ethylene chloride, propylene chloride, and propane, respectively, by our process, Equations (2) and (3) showing the concurrent production of carbon tetrachloride.

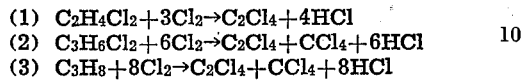

We can use aliphatic chlorides, such as butylene and amylene chloride, in our process but the yields of tetrachloroethylene obtained are not as high as when the lower members of the series are used, since more carbon tetrachloride is produced. The use of mixtures of propane and butane obtained from oil refinery still gases produces good yields of tetrachloroethylene. The foregoing reactions are strongly exothermic in character, so that it is unnecessary to supply additional heat to the molten bath wherein the reaction takes place beyond that generated therein by the reaction.

To produce a mixture of an aliphatic hydrocarbon or chloride thereof, and chlorine, suitable for passing into the molten chloride bath, we have found it convenient to preheat the hydrocarbon or chloride to a temperature between about 120° and about 180° C. before admixing the chlorine therewith. Highly concentrated chlorine is not essential for use in our process. In fact we generally have used commercial chlorine direct from electrolytic cells, which contains up to 20 per cent of air. The bath in which the reaction is carried out may comprise mixtures of the chlorides of aluminum, magnesium, potassium, iron, sodium, bismuth, zinc, and other metals. The mixture of chlorides employed must be fluid at the temperature at which it is desired to run any particular reaction. For example, the eutectic produced by mixing 60 parts by weight of aluminum chloride, 30 parts of sodium chloride, and 10 parts of ferric chloride is entirely suitable for our purpose. Bismuth chloride or zinc chloride can be used alone to provide a satisfactory bath. The above eutectic has a melting point of approximately 150° C. and a boiling point above 1000° C. The type of vessel in which the mixture of aliphatic hydrocarbon or chloride thereof, and chlorine may be reacted is capable of considerable variation.

Referring now to the drawing:—

A suitable aliphatic hydrocarbon or chloride thereof is passed into the pipe 1 coiled in the preheater 2, and thence into the mixing chamber 3. Steam is admitted through the pipe 4 to the preheater to heat the gas passing through the pipe coil therein. Chlorine is passed into the mixing chamber 3 through the pipe 5. The mixture of chlorine and hydrocarbon gas passes down through the annular space 6 between the wall of the pipe 7 and the wall of the cooling tube 8 into the molten bath 9 contained in the chamber 10. Steam is admitted to the cooling tube 8 through the pipe 11 to cool the wall of the tube and prevent the gaseous reaction mixture passing down the annular space 6 from reaching reaction temperature before contact with the molten bath. The reaction gases bubble out through the perforated tube 12 into the molten bath 9 and the gaseous reaction products leave the chamber 10 through the pipe 13 passing to a condensing system. A gas burner 14 is provided to heat the chamber 10 to melt the mixture of metallic chlorides therein when starting operation of the process.

An example illustrating the practice of our invention in the type of reactor hereinbefore described is as follows:—a mixture in the proportion of 100 pounds of 50 per cent propane—50 per cent butane refinery gas, above mentioned, and 1200 pounds of chlorine, was passed at the rate of about 80 pounds per hour through the preheater and the temperature thereof raised to about 150° C. and thence into a metallic chloride bath which has been raised to a temperature of approximately 380° C. The bath used was the aluminum chloride-sodium chloride-ferric chloride eutectic hereinbefore mentioned. The rate at which the reaction mixture was passed into the molten bath was so controlled that the reaction temperature remained substantially at about 380° C.

Utilizing 100 pounds of the propane-butane and 1200 pounds of chlorine, we have obtained 390 pounds of tetrachloroethylene, 190 pounds of carbon tetrachloride, and as by-products approximately 35 pounds each of hexachloroethane and hexachlorobenzene. About 650 pounds of hydrogen chloride was produced.

Using a mixture of one part by weight ethylene chloride and 2 parts chlorine, treated at the rate of 180 pounds per hour, we have obtained yields of tetrachloroethylene averaging nearly 80 per cent of theoretical, based on the amount of ethylene chloride fed into the reactor.

Among the advantages of our novel process for the preparation of tetrachloroethylene from aliphatic hydrocarbons containing two or more carbon atoms in the molecule, and the chlorinated derivatives thereof, are (1) substantially only carbon chlorides are obtained; (2) a high percentage of tetrachloroethylene is obtained in the reaction product; and (3) the heat required to maintain the metallic chloride bath in fluid condition is supplied by the reaction.

Other modes of applying the principle of our invention may be employed instead of those explained, change being made as regards the process herein disclosed, provided the means stated by any of the following claims or the equivalent of such stated means be employed.

We therefore particularly point out and distinctly claim as our invention:—

1. In preparing carbon chlorides, the step which consists in passing a mixture of chlorine and a compound selected from the class consisting of saturated aliphatic hydrocarbons having two or more carbon atoms in the molecule and saturated chlorinated aliphatic hydrocarbons into molten metal chlorides maintained at a temperature above about 250° C., but below the temperature at which the carbon chlorides produced are decomposed.

2. In preparing carbon chlorides, the step which consists in passing a mixture of chlorine and a compound selected from the class consisting of saturated aliphatic hydrocarbons having two or more carbon atoms in the molecule and saturated chlorinated aliphatic hydrocarbons into molten metal chlorides maintained at a temperature between about 250° and about 500° C.

3. In preparing carbon chlorides, the steps which consist in preheating a compound selected from the class consisting of saturated aliphatic hydrocarbons having two or more carbon atoms in the molecule and saturated chlorinated aliphatic hydrocarbons to a temperature between about 120° and about 180° C., mixing chlorine therewith, and passing the gaseous mixture into a molten bath of metal chlorides at a temperature between about 250° and about 500° C.

4. In preparing carbon chlorides, the steps which consist in preheating a compound selected from the class consisting of saturated aliphatic hydrocarbons having two or more carbon atoms in the molecule and saturated chlorinated aliphatic hydrocarbons to a temperature between about 120° and about 180° C., mixing chlorine therewith, subjecting the mixture to a temperature between about 250° and about 500° C. in a molten bath of metal chlorides, cooling the reaction products, and separating carbon chlorides therefrom.

5. In preparing tetrachloroethylene, the step which consists in subjecting a mixture of chlorine and a compound selected from the class consisting of saturated aliphatic hydrocarbons having two or more carbon atoms in the molecule and saturated chlorinated aliphatic hydrocarbons to a temperature between about 250° and about 500° C. in a molten bath of metal chlorides.

6. In preparing tetrachloroethylene, the steps which consist in preheating a compound selected from the class consisting of saturated aliphatic hydrocarbons having two or more carbon atoms in the molecule and saturated chlorinated aliphatic hydrocarbons to a temperature between about 120° and about 180° C., mixing therewith chlorine, and subjecting the mixture to a temperature between about 250° and about 500° C. in a molten bath of metal chlorides.

7. In preparing carbon chlorides, the steps which consist in preheating a compound selected from the class consisting of saturated aliphatic hydrocarbons having two or more carbon atoms in the molecule and saturated chlorinated aliphatic hydrocarbons to a temperature between about 120° and about 180° C., mixing therewith chlorine, passing the gaseous mixture into a molten bath of metal chlorides maintained at a temperature between about 250° and about 500° C., cooling the reaction products, and separating tetrachloroethylene therefrom.

8. In preparing tetrachloroethylene, the steps which consists in pre-heating propylene chloride to a temperature between about 120° and about 180° C., mixing therewith chlorine and passing the mixture into a molten bath of metal chlorides maintained at a temperature between about 250° and about 500° C.

9. In preparing tetrachloroethylene, the step which consists in passing chlorine and a refinery gas mixture consisting of saturated aliphatic hydrocarbons into a bath of molten metal chlorides maintained at a temperature between about 250° and 500° C.

10. In preparing tetrachloroethylene, the step which consists in passing a mixture of olefine chlorides containing three or more carbon atoms in the molecule into a molten bath of metal chlorides maintained at a temperature between about 250° and 500° C.

JOHN J. GREBE.
JOHN H. REILLY.
RALPH M. WILEY.